US006687285B1

(12) United States Patent
Jou

(10) Patent No.: US 6,687,285 B1
(45) Date of Patent: Feb. 3, 2004

(54) METHOD AND APPARATUS FOR SUPERVISING THE PERFORMANCE OF A QUICK PAGING CHANNEL IN A DUAL EVENT SLOTTED PAGING SYSTEM

(75) Inventor: Yu-Cheun Jou, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/272,802

(22) Filed: Mar. 19, 1999

(51) Int. Cl.$^7$ .................................................. H04B 1/69
(52) U.S. Cl. ...................................... 375/133; 455/458
(58) Field of Search ................................. 375/130, 133, 375/141, 136, 137, 220; 370/278, 335, 431, 328, 441, 479, 331, 332; 455/442, 502, 676, 436, 440

(56) References Cited

U.S. PATENT DOCUMENTS

| 4,845,491 A | 7/1989 | Fascenda et al. ............ 340/825 |
| 5,301,225 A | 4/1994 | Suzuki et al. ................. 379/59 |
| 5,377,183 A | 12/1994 | Dent ............................. 370/18 |
| 5,382,949 A | 1/1995 | Mock et al. ................. 340/825 |
| 5,392,287 A | 2/1995 | Tiedemann, Jr. et al. ..... 370/95 |

(List continued on next page.)

FOREIGN PATENT DOCUMENTS

| EP | 0428126 | 5/1991 | ............ H04Q/7/04 |
| EP | 06299095 | 12/1994 | |
| GB | 2249409 | 11/1991 | ............ H04Q/7/04 |
| WO | 9010987 | 9/1990 | |
| WO | 9409599 | 4/1994 | ............ H04Q/7/04 |
| WO | 9854919 | 12/1998 | |

*Primary Examiner*—Emmanuel Bayard
(74) *Attorney, Agent, or Firm*—Philip Wadsworth; Kent Baker; Brian S. Edmonston

(57) ABSTRACT

A mobile station operating in the slotted mode, while monitoring the Quick Paging Channel, monitors the Paging Channel in its assigned slot at least once every N minutes, regardless of what the Quick Paging Channel indicates for that slot. The mobile station shall keep a counter for the number of false alarms that have occurred and another counter for the number misses that have occurred. The count of accumulated false alarms (QPCH_FA) and the count of accumulated misses (QPCH_MISS) are stored by the mobile station and will be sent to the base station when so requested. These two counters can be reset at powering-up or by the base station via messaging, or both. When the number of accumulated misses in a given time interval $T_1$ exceeds a certain threshold $N_{m1}$, the mobile station may send a message to inform the base station of this. When the number of accumulated misses in a given time interval $T_2$ exceeds a threshold $N_{m2}$, the mobile station shall monitor the Paging Channel in its assigned slots regardless of what the Quick Paging Channel indicates. $T_2$ and $N_{m2}$ could be the same as or different from $T_1$ and $N_{m1}$, respectively. The mobile station returns to follow the Quick Paging Channel indication as to whether to monitor the Paging Channel or not when the number of accumulated misses in a given time interval $T_3$ drops below a certain threshold $N_{m3}$, or when $N_{h1}$ hits occur in a row, or both.

32 Claims, 5 Drawing Sheets

U.S. PATENT DOCUMENTS

| | | | |
|---|---|---|---|
| 5,392,452 A | 2/1995 | Davis | 455/38 |
| 5,398,021 A | 3/1995 | Moore | 340/825 |
| 5,450,071 A | 9/1995 | DeLuca et al. | 340/825 |
| 5,481,254 A | 1/1996 | Gaskill et al. | 340/825 |
| 5,485,463 A | 1/1996 | Godoroja | 370/95 |
| 5,491,718 A | 2/1996 | Gould et al. | 375/205 |
| 5,511,067 A | 4/1996 | Miller | 370/18 |
| 5,511,110 A | 4/1996 | Drucker | 379/57 |
| 5,537,097 A | 7/1996 | Eriksson et al. | 340/825 |
| 5,544,223 A | 8/1996 | Robbins et al. | 379/58 |
| 5,629,940 A | 5/1997 | Gaskill | 370/311 |
| 5,659,573 A | 8/1997 | Bruckert et al. | 375/200 |
| 5,686,898 A * | 11/1997 | Willard et al. | 340/825.04 |
| 5,710,784 A | 1/1998 | Kindred et al. | 371/43 |
| 5,809,419 A * | 9/1998 | Schellinger et al. | 455/434 |
| 5,870,673 A * | 2/1999 | Haartsen | 455/426 |
| 5,870,678 A * | 2/1999 | Matsushiro et al. | 455/464 |
| 5,884,188 A * | 3/1999 | Hayes, Jr. | 455/552 |
| 5,987,317 A * | 11/1999 | Venturini | 455/412 |
| 5,999,990 A * | 12/1999 | Sharrit et al. | 710/8 |
| 6,002,917 A * | 12/1999 | Kang | 340/7.24 |
| 6,151,311 A * | 11/2000 | Wheatley, III et al. | 370/335 |
| 6,154,637 A * | 11/2000 | Wright et al. | 455/66 |
| 6,157,815 A * | 12/2000 | Collins et al. | 455/38.1 |
| 6,161,103 A * | 12/2000 | Anderson et al. | 455/435 |
| 6,396,867 B1 * | 5/2002 | Tiedemann, Jr. et al. | 375/141 |
| 6,421,540 B1 * | 7/2002 | Gilhousen et al. | 455/458 |

* cited by examiner

METHOD AND APPARATUS FOR SUPERVISING THE PERFORMANCE OF A QUICK PAGING CHANNEL IN A DUAL EVENT SLOTTED PAGING SYSTEM

RELATED APPLICATIONS

BACKGROUND OF THE INVENTION

I. Field of the Invention

The present invention relates to wireless telecommunications. More particularly, the present invention relates to a novel and improved method and apparatus for paging a cellular telephone or other wireless communications device.

II. Description of the Related Art

The IS-95 cellular telephone standard (and its derivatives such as IS-95A and ANSI J-STD-008 referred to herein collectively as IS-95) uses advanced signal processing techniques to provide efficient and high quality cellular telephone service. For example, an IS-95 compliant cellular telephone system utilizes vocoding, error detection, forward error correction (FEC), interleaving and spread spectrum modulation in order to make more efficient use of the available RF bandwidth, and to provide more robust connections. In general, the benefits provided by IS-95 include longer talk time, higher capacity, and fewer dropped calls when compared to other types of cellular telephone systems.

To conduct communications in an orderly manner, IS-95 provides a set of highly encoded channels over which data having different functions is transmitted. These highly encoded channels include a paging channel over which paging messages are transmitted notifying cellular telephones or other types of wireless terminals that an incoming request to communicate is pending. In accordance with the IS-95 standard, paging messages are transmitted at low to medium data rates (4800 or 9600 bps) during time slots that are pre-assigned to groups of cellular telephones. Table I provides the data included in a General Page Message as an example of a typical paging message generated substantially in accordance with the IS-95A standard.

TABLE I

| Message Field | Length (Bits) |
| --- | --- |
| MSG_TYPE (Message Type) | 8 |
| CONFIG_MSG_SEQ | 6 |
| ACC_MSG_SEQ | 6 |
| CLASS_0_DONE | 1 |
| CLASS_1_DONE | 1 |
| RESERVED | 2 |
| BROADCAST_DONE | 1 |
| RESERVED | 4 |
| ADD_LENGTH | 3 |
| ADD_PFIELD | 8 × ADD_LENGTH |
| And zero or more occurrences of the following page record: | |
| PAGE_CLASS | 2 |
| PAGE_SUBCLASS | 2 |
| Page class specific fields | Typically 2–12 bytes. |

Table I is provided simply to illustrate the length of a typical paging message, so a detailed description of the function of each field is not included herein. Such a detailed description may be obtained, however, by referring to the well known, and publicly available, IS-95 standard (in particular the IS-95A standard). The paging messages also begin with an eight bit message length field (MSG_LEN), that indicates the length of the message, and end with a 30 bit cyclical-redundancy-check (CRC) field (not shown).

To monitor for paging messages, a cellular telephone periodically monitors the paging channel during the assigned paging slot. In particular, the cellular telephone periodically activates complex RF and digital signal processing circuitry for as long as is necessary to successfully process the paging message. Since the typical paging message is relatively long, and transmitted via a highly encoded low to medium rate channel, the associated processing during each paging slot requires a significant amount of time and signal processing resources, and therefore requires a significant amount of power to complete. This reduces the amount of time an IS-95 cellular telephone can remain in standby mode using a battery of given capacity, and therefore is highly undesirable.

SUMMARY OF THE INVENTION

The present invention is a novel and improved method and system for paging a cellular telephone or other wireless terminal that reduces standby mode power consumption. In accordance with one embodiment of the invention, a minimally encoded quick paging channel is established over which short, quick page messages are transmitted during one of a set of quick paging slots. The quick page message indicates that a request to communicate has been received and that the receiving communication terminals should process a highly encoded full paging channel transmitted during the next full paging slot for a more detailed, full page message. A communications terminal monitors full paging channel after a quick page message has been received on the quick paging channel.

To page the communications terminal, a base station controller first generates the quick page message during a quick page slot assigned to a set of communications terminal that includes the particular communications terminals being paged. This is followed by a full page message identifying the particular communications terminal. The communications terminal periodically monitors the quick paging slot and, upon detecting the quick page, activates decoding circuitry for processing the full paging channel. Upon processing the full paging channel, the communications terminal determines if the full page message is directed to it, and if not, deactivates the decoding circuitry and returns to processing the quick paging channel.

Since the Quick Paging Channel carries only indicator bits, and no messages with CRC, a direct supervision of the Quick Paging Channel is not feasible as with that of the Paging Channel or the Traffic Channel. However, a loss of the Quick Paging Channel due to either base station transmission error or mobile station detection error will cause missed pages and, as a result, affect the service quality. A method to indirectly supervising the Quick Paging Channel is proposed below to mitigate this problem.

In the present invention, using the quick paging channel can result in one of four possible outcomes—a false alarm, a miss, a hit or an erasure. A false alarm is an event in which the Quick Paging Channel indicates there is a page addressed to the mobile station while no page is received in its assigned Paging Channel slot (with the Paging Channel message received correctly). A miss is an event in which the Quick Paging Channel indicates there is no page addressed to the mobile station while a page is received in its assigned Paging Channel slot. A hit is an event in which the Quick Paging Channel indicates there is a page addressed to the mobile station while a page is indeed received in its assigned Paging Channel slot. In the exemplary embodiment, the Quick Paging Channel is transmitted at a fixed transmission energy relation to the pilot channel transmitted by base station 12. The relationship of the quick paging channel energy to the pilot channel is known by mobile station 10. When the energy of the pilot channel received by mobile station 10 is below a predetermined level, mobile station 10 determines that detection of the quick paging channel is not reliable and declares an erasure.

A mobile station operating in the slotted mode, while monitoring the Quick Paging Channel, shall monitor the Paging Channel in its assigned slot at least once every N minutes, regardless of what the Quick Paging Channel indicates for that slot. An example value for N is 10. The N-minute windows in time can be disjoint fixed windows next to each other. An alternative is a moving window that moves with the slot cycle. Another alternative is a moving window with its start reset when a hit occurs.

In the present invention, mobile station 10 keeps a first counter for the number of false alarms that have occurred (QPCH_FA), a second counter for the number of misses that have occurred (QPCH_MI), a third counter for the number of hits that have occurred (QPCH_HI), a fourth counter for the number of erasures that have occurred (QPCH_ER) and a fifth counter for the total number of Quick Paging Channel messages received in the time interval (QPCH_TO). The values recorded in these counters are stored by the mobile station and will be sent to the base station when so requested. These counters can be reset at powering-up or by the base station via messaging, or both. When the number of accumulated misses in a given time interval $T_1$ exceeds a certain threshold $N_{m1}$, the mobile station may send a message to inform the base station of this. When the number of accumulated misses in a given time interval $T_2$ exceeds a threshold $N_{m2}$, the mobile station shall monitor the Paging Channel in its assigned slots regardless of what the Quick Paging Channel indicates. $T_2$ and $N_{m2}$ could be the same as or different from $T_1$ and $N_{m1}$, respectively. The mobile station may return to follow the Quick Paging Channel indication as to whether to monitor the Paging Channel or not when the number of accumulated misses in a given time interval $T_3$ drops below a certain threshold $N_{m3}$, or when $N_{h1}$ hits occur in a row, or both.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Quick Paging Channel

A method and system for paging a cellular telephone or other wireless terminal that reduces standby mode power consumption is described. In the following description the invention is set forth in the context of a cellular telephone system operating substantially in accordance with the IS-95 standard. While the invention is particularly suited for operation in such an environment, many other digital communication systems can benefit from the use of the present invention, including TDMA based wireless communication systems, satellite based communication systems, and wireline systems over which encoded signaling is transmitted.

Figure 2:
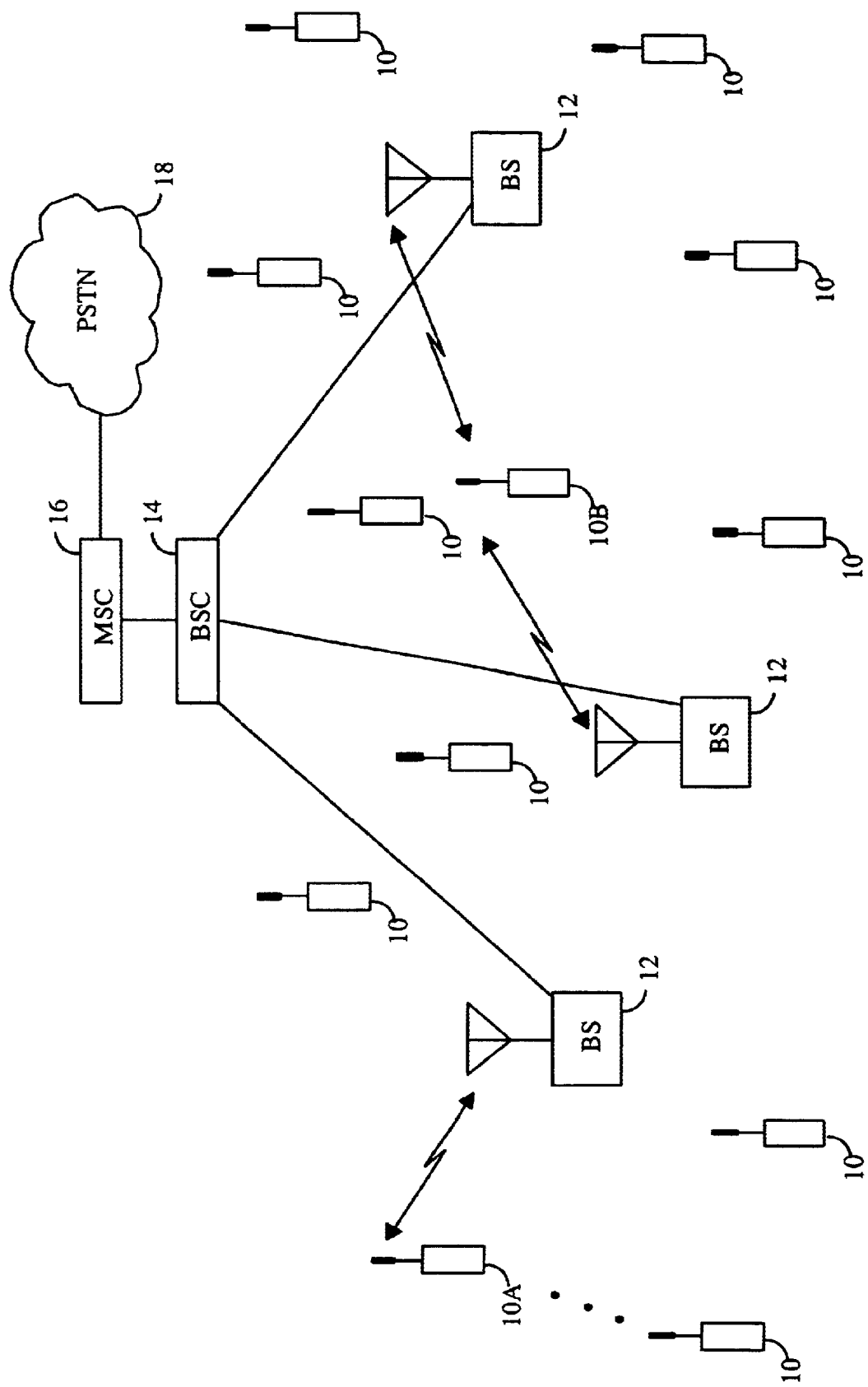
FIG. 2 is a block diagram of a cellular telephone system.

FIG. 2 is a block diagram of a highly simplified cellular telephone system configured in accordance with the use of the present invention. Wireless terminals 10 (typically cellular telephones) are located among base stations 12. Wireless terminals 10a and 10b are in active mode and therefore are interfacing with one or more base stations 12 using radio frequency (RF) signals modulated in accordance with the CDMA signal processing techniques of the IS-95 standard. A system and method for processing RF signals substantially in accordance with the use of the IS-95 standard is described in U.S. Pat. No. 5,103,459 entitled "System and Method for Generating Signal Waveforms in a CDMA Cellular Telephone System" assigned to the assignee of the present invention and incorporated herein by reference ('459 patent). The other wireless terminals 10 are in standby mode and therefore monitoring for page messages indicating a request to communicate.

In the preferred embodiment of the invention, each base station generates forward link signals comprised of a set of forward link channels. The channels are established by a set of orthogonal 64 chip (or bit) Walsh codes, each of which is used to modulate the data associated with a particular channel. The channels are categorized by function and include a pilot channel over which a phase offset pattern is repeatedly transmitted, a synch channel over which synchronization data is transmitted including the absolute system time and the phase offset of the associated pilot channel, and traffic channels over which the data directed to the terminals are transmitted. The traffic channels are normally assigned to transmit data to a particular wireless terminal 10 for the duration of the interface with that particular base station.

Additionally, in accordance with one embodiment of the invention, one or more of the Walsh channels are designated as quick paging channels, and one or more of the Walsh channels as full paging channels. The designation and operation of the full paging channels is preferably performed in accordance with the paging channel specified by the IS-95 standard. Some methods and apparatus for performing paging substantially in accordance with the IS-95 standard are described in U.S. Pat. No. 5,392,287 ('287 patent) entitled "APPARATUS AND METHOD FOR REDUCING POWER CONSUMPTION IN A MOBILE COMMUNICATIONS RECEIVER" AND U.S. Pat. No. 5,509,015 ('015 patent) entitled "METHOD AND APPARATUS FOR SCHEDULING COMMUNICATIONS BETWEEN TRANSCEIVERS" both assigned to the assignee and incorporated herein by reference.

As described in the '287 and '015 patents, and as specified by the IS-95 standard, the full paging channel is time divided into time "slots." The slots are, in turn, assigned to groups of wireless terminals, where the assignment is performed based on the International Mobile Subscriber ID (IMSI) which is unique for each wireless terminal 10, or other terminal identification information such as one or more Mobile Identification Numbers (MIN). In alternative embodiments of the invention other identification information may also be used including the electronic serial number (ESN) of the wireless terminal or the temporary mobile Subscriber ID (TMSI). Others will recognize additional values that may be used. The various possible types of identification information that may be used will be referred to hereinafter collectively as the MOBILE ID. The quick paging channels are also divided into time slots.

In the exemplary embodiment, the present invention is described with respect to the quick paging channel contemplated by the Telecomunnications Industry Association for sue with its cdma2000 third generation CDMA proposed standard. However, the present invention is equally applicable to any paging system wherein a separate channel is used to indicate to a mobile station whether or not to receive a full page message. In the exemplary embodiment, a Quick Paging Channel message is transmitted on a code channel different from the code channel used in the transmission of the actual paging information. A mobile station wakes up and demodulates the Quick Paging Channel and determines whether it must receive the full page message on the separate code channel upon which full page messages are transmitted. A similar operation can be provided in a TDMA system by placing an indication as to whether the mobile station should receive a full page message in a time slot prior to the time slot of the actual full page message. In an FDMA system this can be provided by placing the quick paging channel message on a frequency separate from that on which the paging channel message is provided. Moreover, the quick paging channel message need not be provided on separate channels it need only precede that arrival of the full page message with sufficient time to allow the mobile station to respond to the message.

The quick paging channel contains single bit messages to direct slotted-mode mobile stations to monitor their assigned slot on the paging channel. In the exemplary embodiment, the Quick Paging Channel data rate is 9600, 4800 or 2400 bps, and is specified in an overhead message. In the exemplary embodiment, each single bit message is transmitted twice per 80 ms slot. In the exemplary embodiment, the two bit decoding of the Quick Paging Channel is performed in the following manner. If the first Quick Paging Channel indication bit is set to '0', the mobile station goes back to sleep. If the first Quick Paging Channel indication bit is set to '1', the mobile station receives the second paging indication bit. If the second Quick Paging Channel indication bit is set to '0', the mobile station goes back to sleep. If the second Quick Paging Channel indication bit is set to '1', the mobile station receives the Paging Channel in the following Paging Channel slot.

In the exemplary embodiment, the Quick Paging Channel is an on-off keyed signal. When a group of mobile stations are to receive the full page message, a message indicative of this request is transmitted by providing a signal of a predetermined amount of energy on a predetermined code channel in designated time slots prior to the transmission of the full page message. Conversely, when the group of mobile stations are not to receive the full page message, no energy is transmitted on the Quick Paging Channel code channel in designated time slots. Thus, at the mobile station receiver, reception of the quick paging channel message consists simply of demodulating the received signal in accordance with the code channel parameters of the Quick paging channel and comparing the demodulated signal to a predetermined energy threshold value. If the demodulated signal energy exceeds this threshold a quick paging channel message is determined to be present and if the demodulated signal energy is below the threshold a quick paging channel message is determined to be absent.

In the exemplary embodiment, the base station transmits the quick paging channel in a fixed relation to the pilot channel transmitted by that base station. The generation and transmission of a code channel pilot signal is well known in the art and is described in detail in the aforementioned U.S. Pat. No. 5,103,459. The mobile station monitors the energy of the received pilot signal. When the pilot energy falls below a predetermined threshold value, the mobile station determines that detection of the quick paging channel message will prove unreliable. In these cases, the mobile station declares an erasure on the Quick Paging Channel message and checks the full page without regard to the Quick Paging Channel message. In the exemplary embodiment, the Quick Paging Channel operates at 3 dB below the pilot when transmitting. In the exemplary embodiment, Quick Paging Channel protocol provides for scheduling the transmission of the paging indication bits for a specific mobile station in certain assigned slots. The mobile station monitors the Quick Paging Channel in the 80 ms time slot before the mobile station's assigned Paging Channel slot. The earliest starting time for the corresponding paging indication bit is given by time t, where $$(\lfloor (t-5)/4 \rfloor - \text{PGSLOT}) \bmod (16 \times T) = 0. \tag{1}$$

Figure 1:
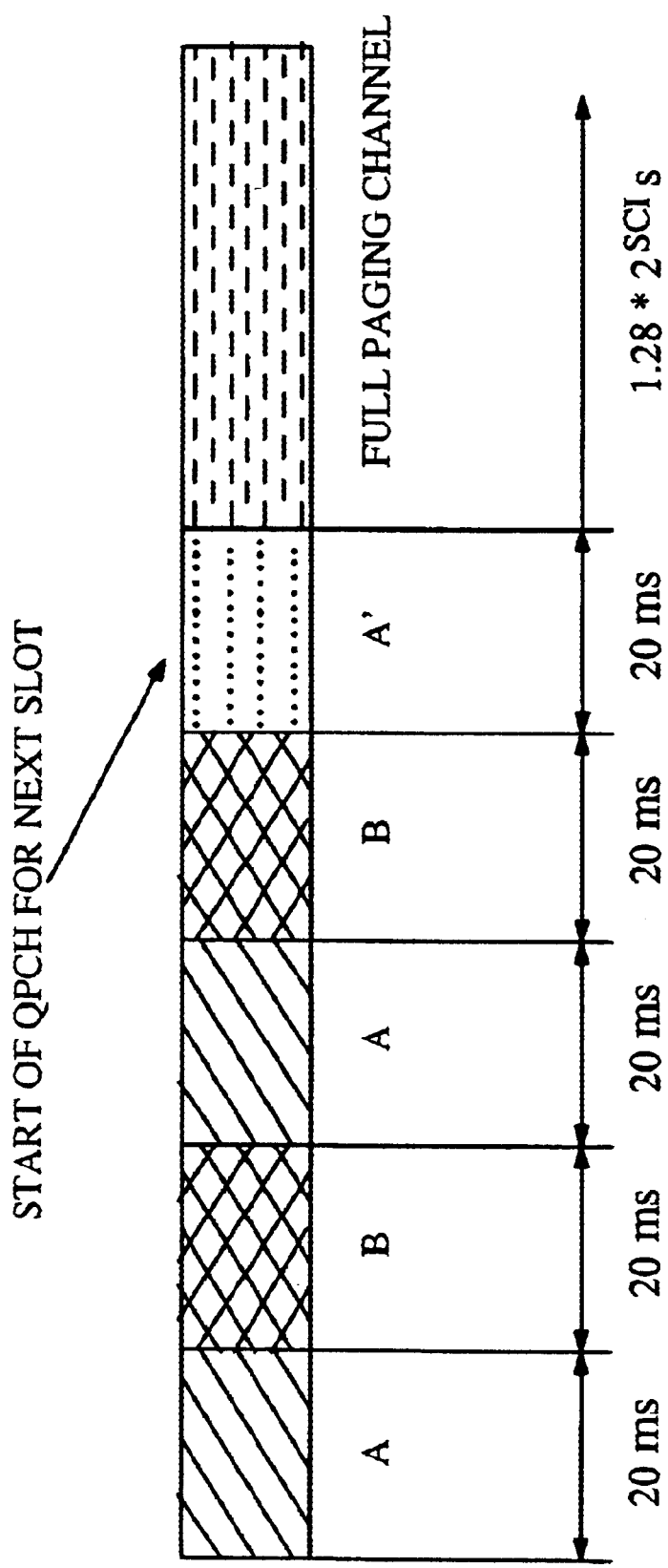
FIG. 1 is a timing diagram illustrating the exemplary timing relationship between the Quick Paging Channel message and the corresponding full page.

In the exemplary embodiment, the mobile station is hashed into two groups: A or B. Group A mobile station receives the first paging indication bit between (t*−100) ms and (t*−80) ms, and second bit between (t*−60) ms and (t*−40) ms, where t* is the start time of Paging Channel. Group B mobile station receives the first paging indication bit between (t*−80) ms and (t*−60) ms, and second bit between (t*−60) ms and (t*−40) ms, where t* is the start time of Paging Channel or Forward Common Control Channel. The timeline of Quick Paging Channel is shown in FIG. 1. If the first paging indication bit is set to '0', the mobile station can go back to sleep. If the first paging indication bit is set to '1', the mobile station shall receive the second paging indication bit. If the second paging indication bit is set to '0', the mobile station can go back to sleep. If the second paging indication bit is set to '1', the mobile station shall receive the Paging Channel in the following Paging Channel slot. Note: In the figure, SCI refers to the SLOT_CYCLE_INDEX.

In the exemplary embodiment, to determine the mobile station's assigned bit positions, the mobile station shall use the hash function specified below to decide R1 and R2. It will be understood that the present invention is equally applicable to other hashing algorithms or to any other means for assigning a mobile station to a paging channel slot. Certain procedures require a uniform distribution of mobile stations among N resources. The following function returns an integer, using as arguments the mobile station's IMSI or ESN, the number of resources N, and a modifier DECORR. The modifier serves to decorrelate the values obtained for the various applications from the same mobile station.

If the hashing function is to be used for determining the Access Channel PN Randomization, HASH_KEY shall be equal to the mobile station ESN. Otherwise, HASH_KEY shall be equal to the 32 least significant bits of IMSI_O_S1+$2^{24}$×IMSI_O_S2). Employing the following definitions:

Word L to be bits 0–15 of HASH_KEY, and (2)

Word H to be bits 16–31 of HASH_KEY, (3)

where bit 0 is the least significant bit of HASH_KEY.

For determining CDMA Channel Number, Paging Channel Number, Quick Paging Channel Number, Paging Slot Number, and Access Channel PN Randomization, the hash value is computed as follows:

$$R = \lfloor N \times ((40503 \times (L \oplus H \oplus \text{DECORR})) \bmod 2^{16}) / 2^{16} \rfloor. \quad (4)$$

For determining mobile station's assigned paging indication bit positions in the 80 ms time slot before the assigned Paging Channel slot, in units of paging indication bits (128 or 256PN chips for 9600 and 4800 bps data rate, respectively), the hash value is computed as follows:

$$R_1 = \lfloor N_1 \times ((40503 \times (L \oplus H \oplus \text{DECORR}_1)) \bmod 2^{16}) / 2^{16} \rfloor, \text{ and} \quad (5)$$

$$R_2 = \lfloor N_2 \times ((40503 \times (L \oplus H \oplus \text{DECORR}_2)) \bmod 2^{16}) / 2^{16} \rfloor + N_1. \quad (6)$$

The mobile station shall choose the range N, $N_1$, $N_2$ and the modifier DECORR, $\text{DECORR}_1$, and $\text{DECORR}_2$ according to the application as shown in Table 1 below. In the table, HASH_KEY [0 . . . 11] denotes the 12 least significant bits of HASH_KEY.

TABLE 1

Hash Function Modifier

| Application | N | DECORR | Return Value |
|---|---|---|---|
| CDMA Channel Number | Number of channels in last CDMA Channel List Message (up to 10) | 0 | R + 1 |
| Paging Channel Number | PAGE_CHAN$_S$ from System Parameters Message (up to 7) | 2 × HASH_KEY [0 ... 111] | R + 1 |
| Quick Paging Channel Number | Q_PAGE_CHAN$_S$ from Extended System Parameters Message (up to 7) | 2 × HASH_KEY [0 ... 11] | R + 1 |
| Paging Slot Number | 2048 | 6 × HASH_KEY[0 ... 11] | R |
| Access Channel PN Randomization | $2^{\text{PROBE\_PN\_RAN}_S}$ where PROBE_PN_RAN$_S$ is from Access Parameters Message (up to 512) | 14 × HASH_KEY[0 ... 11] | R |
| Paging Indication Bit Positions | $N_1$ = 384 (for 9600 bps), or 192 (for 4800 bps) $N_2$ = 192 (for 9600 bps), or 96 (for 4800 bps) | $\text{DECORR}_1 = \lfloor t/64 \rfloor$ mod $2^{16}$ $\text{DECORR}_2 = \lfloor t/64 + 1 \rfloor$ mod $2^{16}$ | $R_1$ and $R_2$ |

II. Supervision of Quick Paging Channel

Base station 12 may transmit a "0" or a "1" on the Quick Paging Channel. Base station 12 may transmit a "1" on the Quick Paging Channel either because there is a paging message directed to mobile station 10, or because there is a system configuration change of which mobile station 10 must be alerted or because base station 12 wants to test mobile station 10's ability to receive a "1" on the Quick Paging Channel. Conversely, base station 12 may transmit a "0" on the Quick Paging Channel either because there is not a paging message directed to mobile station 10, or because there has not been system configuration change of which mobile station 10 must be alerted or because base station 12 wants to test mobile station 10's ability to receive a "0" on the Quick Paging Channel.

When base station 12 sends a "0" or a "1" on the Quick Paging Channel, mobile station 10 may receive either a "0," a "1" or an erasure. If base station 12 transmits a "1" and mobile station 10 receives a "1," the event is declared as a hit. If base station 12 transmits a "1," but mobile station 10 receives a "0," a miss has occurred. When base station 12 transmits a "0" on the Quick Paging, but mobile station 10 receives "1" a false alarm results. There are two kinds of errors in this scenario a miss and a false alarm.

Because of the available error correction coding and additional cyclic redundancy bits on traffic channel and paging channel frames, mobile station 10 can detect frame erasures and correctly decoded frames and report the occurrence of these events back to transmitting base station 12. This feedback of signal quality is referred to as direct supervision. Because the Quick Paging Channel carries only indicator bits, typically without forward error correction coding or additional cyclic redundancy check (CRC) bits, direct supervision of the Quick Paging Channel is not feasible as it is with the Paging Channel or the Traffic Channel. However, a loss of the Quick Paging Channel due to either base station transmission error or mobile station detection error causes missed pages and affects service quality. The present invention is directed to a method and apparatus for indirectly supervising the Quick Paging Channel to mitigate problems associated with poor performance of the Quick Paging Channel.

In the exemplary embodiment, the quick paging channel is transmitted at a fixed transmission energy relation to the pilot channel transmitted by base station 12. The relationship of the quick paging channel energy to the pilot channel is known by mobile station 10. When the energy of the pilot channel received by mobile station 10 is below a predetermined level, mobile station 10 determines that detection of the quick paging channel is not reliable and declares an erasure. The threshold is determined by the energy relationship between the Quick Paging Channel and the pilot channel. Alternatively, mobile station 10 checks the energy of the Quick Paging channel directly and determines whether the information on the channel can be relied on. In addition, mobile station 10 can check both the energy of the pilot channel and energy of the Quick Paging Channel in its declaration of an erasure.

In the exemplary embodiment, mobile station 10 operates in the slotted mode, and demodulates the paging channel when the quick paging channel informs mobile station 10 that a full page for some mobiles sharing the same Quick Paging Channel indicator bit or because of a system configuration change or to test mobile station 10's ability to receive a "1" on the Quick Paging Channel. In the present invention, in order to avoid catastrophic failures when the quick paging channel becomes unreliable, mobile station 10 monitors the Paging Channel in its assigned slot at least once in a predetermined time interval, regardless of the detected indication on the Quick Paging Channel. An example value for the time interval is ten minutes. In a first exemplary embodiment, the predetermined time intervals are disjoint fixed adjacent windows. An alternative is a moving window that moves with the slot cycle. A second alternative is a moving window with its starting point reset when a hit occurs.

In the present invention, mobile station 10 keeps a first counter for the number of false alarms that have occurred (QPCH_FA), a second counter for the number of misses that have occurred (QPCH_MI), a third counter for the number of hits that have occurred (QPCH_HI), a fourth counter for the number of erasures that have occurred (QPCH_ER) and a fifth counter for the total number of times mobile station 10 monitors the paging channel after checking the Quick Paging Channel (QPCH_TO). The values in the counters are stored by mobile station 10 and are sent to the base station 12 when so requested or at predetermined time intervals or upon the happening of a predetermined event. In a preferred embodiment, these counters can be reset at powering-up or by the base station via messaging, or both.

In the exemplary embodiment, when the number of accumulated misses in a given time interval $T_1$ exceeds a certain threshold $N_{MI1}$, mobile station 10 sends a message indicating this condition to base station 12. When the number of accumulated misses in a given time interval $T_2$ exceeds a threshold $N_{MI2}$, mobile station 10 monitors the Paging Channel in its assigned slots regardless of what the Quick Paging Channel indicates. $T_2$ and $N_{MI2}$ could be the same as or different from $T_1$ and $N_{MI1}$, respectively. The mobile station 10 returns to follow the Quick Paging Channel indication as to whether to monitor the Paging Channel or not when the number of accumulated misses in a given time interval $T_3$ drops below a certain threshold $N_{MI3}$, or when $N_{HI}$ hits occur in a row, or both.

Mobile station 10 uses the accumulated number of misses and the accumulated number of false alarms to calculate the probability of false alarm and probability of miss which are used to set the energy threshold that is used in the detection of the on-off keyed Quick Paging Channel. When mobile station 10 detects too many false alarms, the energy threshold is increased to reduce the number of times that noise is detected as a "1." Conversely, when mobile station 10 detects too many misses, the energy threshold is decreased to assure that quick paging channel bits that are (1's) are successfully detected. In a preferred embodiment, the two accumulated statistics are used in unison to determine the energy threshold so as to provide the optimal combination of miss probabilities and false alarm probabilities.

Figure 3:
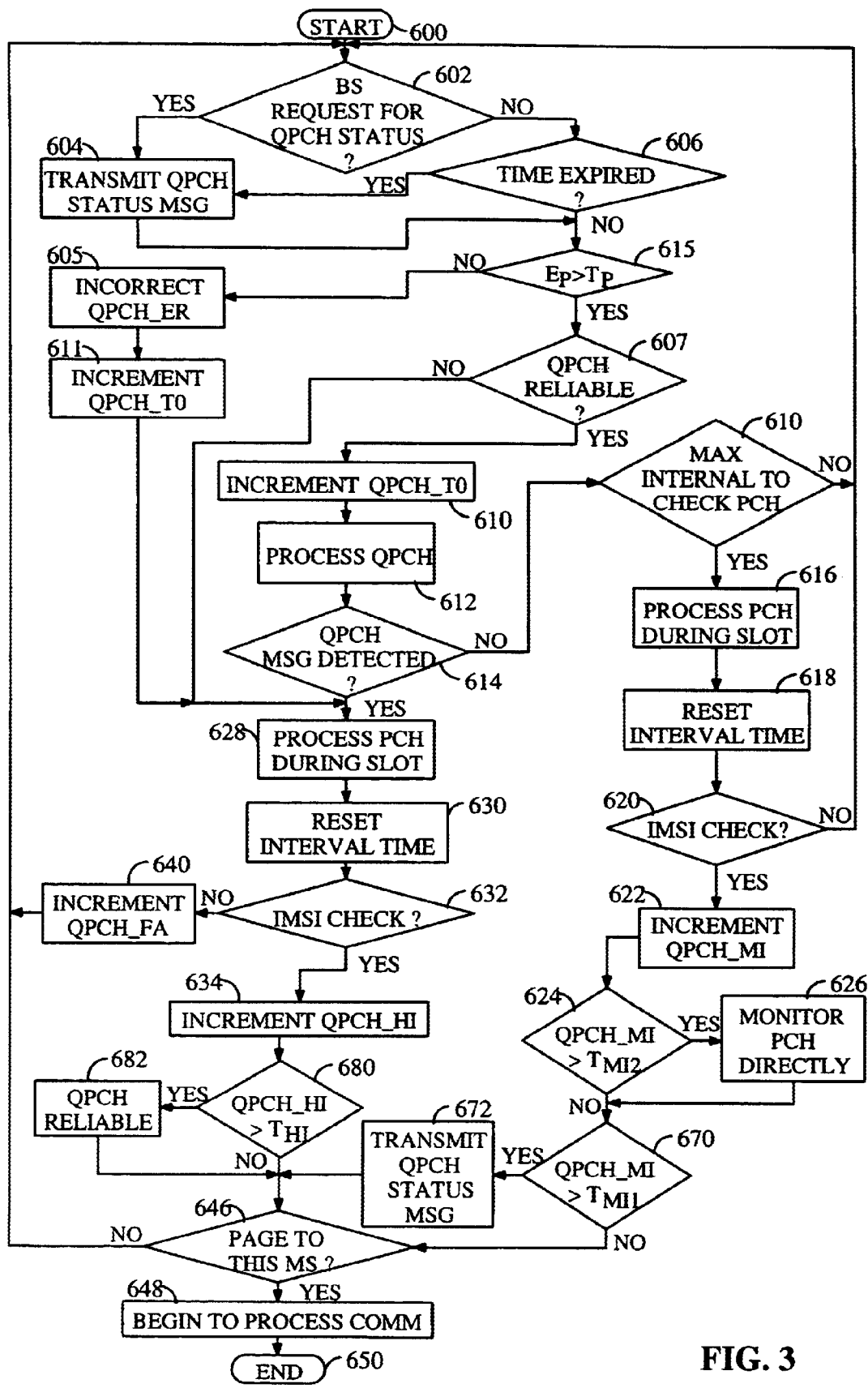
FIG. 3 is a flow diagram illustrating the steps in monitoring the Quick Paging Channel.

FIG. 3 is a flowchart illustrating the proposed method of supervising the performance of the quick paging channel. In block 600, the supervision operation begins. In control block 602, mobile station 10 checks to determine whether it has received a request from base station 12 for a quick paging channel status update. If mobile station 10 has received a request from base station 12 to update its quick paging channel status, then the operation moves to block 604.

In/block 604, mobile station 10 generates a message that includes the accumulated number of hit, miss, false alarms, erasures and total checks of the quick paging channel that have been recorded at mobile station 10 within a predetermined time interval. This message is referred to herein as the quick paging channel status message, which is transmitted to base station 12 in block 604. Base station 12 receives quick paging channel status messages from all mobile stations in its coverage area and determines from these messages the adequacy of the quick paging channel performance. In the exemplary embodiment, if base station 12 determines that the performance is less than desired (i.e. probability of misses is too high), then base station 12 may increase the transmission energy of the quick paging channel or alternatively decrease the data rate of the quick paging channel. If based on the quick paging status messages from mobile stations 10 in its coverage area, the performance of the quick paging channel is better than necessary, base station 12 may reduce the transmission power of the quick paging channel or alternatively increase the data rate of the Quick Paging Channel.

If base station 12 has not requested that a quick paging channel status message be transmitted by mobile station 10, then the operation moves to control block 606. In block 606, mobile station 10 determines whether a maximum period between consecutive quick paging channel status updates has been reached. If the maximum period between consecutive quick paging channel status updates has been reached, then mobile station 10 transmits a quick paging channel status message to base station 12 in block 604. The interval timer is reset whenever a quick paging channel status message is transmitted by mobile station 10. This time based trigger for sending the quick paging channel status message can be in addition to a base station request based system or as an alternative to a request based system.

Following the transmission of the quick paging channel status message or if the maximum time between sending quick paging channel status messages has been reached, operation moves to control block 615. In block 615, mobile station 10 measures the strength of the pilot channel transmitted by base station 12. Based on the measured strength of the pilot channel, mobile station 10 determines whether the energy of the quick paging channel indicator bit will be sufficient for detection. If the pilot strength (Ec/Io) is below a threshold value (Tp) determined in accordance with the known transmitted pilot power level and the transmitted Quick Paging Channel power level, then mobile station 10 declares an erasure and the operation moves to block 605. In block 605, the erasure counter (QPCH_ER) is incremented and the operation moves to block 611. In block 611, the total quick paging channel counter (QPCH_TO) is incremented and flow moves to block 628 wherein the full paging channel message is received.

If the measured received pilot strength exceeds the threshold value in block 615, then the operation moves to block 607. In block 607, mobile station 10 checks to determine whether the quick paging channel has been determined to be unreliable. If the quick paging channel has been determined to be unreliable, then the operation moves to block 628 where mobile station 10 demodulates and decodes the full page at the designated time interval. The counter QPCH_TO is incremented upon monitoring of the paging channel. In one embodiment, even when the Quick Paging Channel has been determined to be unreliable or if an erasure has been declared, it is monitored in order to determine whether after demodulation of the paging channel, the result would have been a hit, miss, or false alarm, and this declaration is used to increment the counters as described above.

If in control block 607, the quick paging channel has not been determined to be unreliable, then the operation proceeds to block 610. In block 610, the counter indicative of the number of times the quick paging channel has been checked is incremented. In block 612, mobile station 10 demodulates and optionally decodes the quick paging channel. In the exemplary embodiment, the Quick Paging Channel is transmitted without any error correction coding or parity bits.

Following the demodulation of the Quick Paging Channel message, mobile station 10 determines whether a quick paging indicator bit of "0" or "1" has been detected. If the received quick paging channel indicator bit is "0", then the operation moves to block 615 as described below.

If in control block 614, the received quick paging channel indicator bit is "1," then the operation moves to block 628. In block 628, mobile station 10 waits until the designated time interval and then demodulates and decodes the message on the paging channel. In block 630, mobile station 10 resets an interval timer that records the time interval between mobile station 10 receiving a paging channel message. The purpose of the interval timer is to be certain that within a predetermined time interval, mobile station 10 will receive the paging channel message without respect to the indications on the quick paging channel. Thus, in the event of a total failure of the quick paging channel, mobile station 10 will intermittently receive a page on the paging channel regardless of the quick paging channel signal and, more importantly, will be able to determine the reliability of the quick paging channel.

The operation then, moves to block 632 in which mobile station 10 checks to determine whether it was supposed to monitor the paging channel at this time. As described initially, the base station may have set the Quick Paging Channel indicator bit to "1" because in order to alert mobile station 10 of a change in configuration to be described in page message, or because of a page directed to mobile stations sharing that Quick Paging Channel indicator bit or to check mobile station 10's ability to receive a "1" on the Quick Paging Channel. In order to determine whether a system configuration change has occurred, mobile station 10 checks the system configuration sequence number.

In order to determine whether mobile stations sharing the Quick Paging Channel indicator bit were paged to received directed page messages, mobile station 10 checks the identity of a mobile stations indicated in the page record portion of the page message. When mobile station 10 fails to find its identification in the page record portion of the page message, mobile station 10, hashes the identity of the mobile station identified in the record portion to verify that that mobile station will share the Quick Paging channel indicator bit with it. If the hashing of the mobile identity from the full page is equal to the hashed result of mobile station 10's mobile identity or if a system configuration change is indicated, mobile station 10 determines that a hit has occurred. If the hashed mobile identifications fail to equate and no system configuration change is indicated, then the operation moves to block 640. In block 640, a false alarm is declared and a counter of false alarms QPCH_FA is incremented. The operation, then returns to block 602 and proceeds as described above.

Returning to control block 632, if the hashed mobile identifications match, then a hit is declared and a counter (QPCH_HI) is incremented in block 634. The operation then moves to control block 680, where mobile station 10 compares the recorded number of hits in the current time interval against a threshold $T_{HI}$. If the number of hits exceeds the predetermined threshold, then in block 682 the quick paging channel is declared to be reliable and will be monitored under normal operating conditions.

Following the execution of block 682 or if in control block 680 the number of hits is less than the threshold $T_{HI}$, the operation proceeds to block 646. In block 646, mobile station 10 determines whether the full page received is addressed to it. If the full page is not addressed to mobile station 10, then the operation returns to block 602 and proceeds as described previously. If the full page is addressed to mobile station 10, then the operation moves to block 648 and communication protocol as described in the first part of the present application is followed. In particular a response message indicative of the reception of the full page from base station 12 is transmitted from mobile station 10. Thereafter, in block 650, the supervision operation terminates until mobile station 10 returns to an idle mode of operation.

If back in control block 614, mobile station 10 demodulates the quick paging channel and the quick paging channel indicates that mobile station 10 was not to receive the paging channel, then the process moves to block 610. In block 610, mobile station 10 determines how much time has elapsed since it last received the paging channel. If the elapsed time is less than a predetermined threshold, then the process returns to block 602 and proceeds as described above. If on the other hand, mobile station 10 determines that the amount of time that has elapsed exceeds a predetermined threshold then in block 616 mobile station 10 receives the paging channel irrespective of the indication received on the quick paging channel.

In block 618, the timer measuring the elapsed time since the last paging channel message was received by mobile station 10 is reset. Then, in block 620, mobile station 10 determines whether it was supposed to receive the paging channel message in the same fashion as described with respect to control block 632.

In control block 624, mobile station 10 compares the recorded number of missed pages in QPCH_MI with a predetermined threshold $T_{MI2}$. If the recorded number of missed pages exceeds the threshold, the operation moves to block 626 and mobile station 10 determines that the quick paging is unreliable and begins to directly monitor the paging channel irrespective of the indication on the quick paging channel.

If in block 624 mobile station 10 determines that the recorded number of misses is below the threshold value $T_{MI2}$ or following the execution of block 626, the operation moves to block 670, which compares the recorded number of misses QPCH_MI against a threshold value $T_{MI1}$. If the recorded number of misses does not exceed the threshold value then, the operation moves to control block 646 and proceeds as described previously. If the recorded number of misses exceeds the threshold value then the operation moves to block 672. In block 672, mobile station 10 transmits the quick paging channel status message to base station 12. Then the operation moves to block 646 and continues as described previously.

Figure 4:
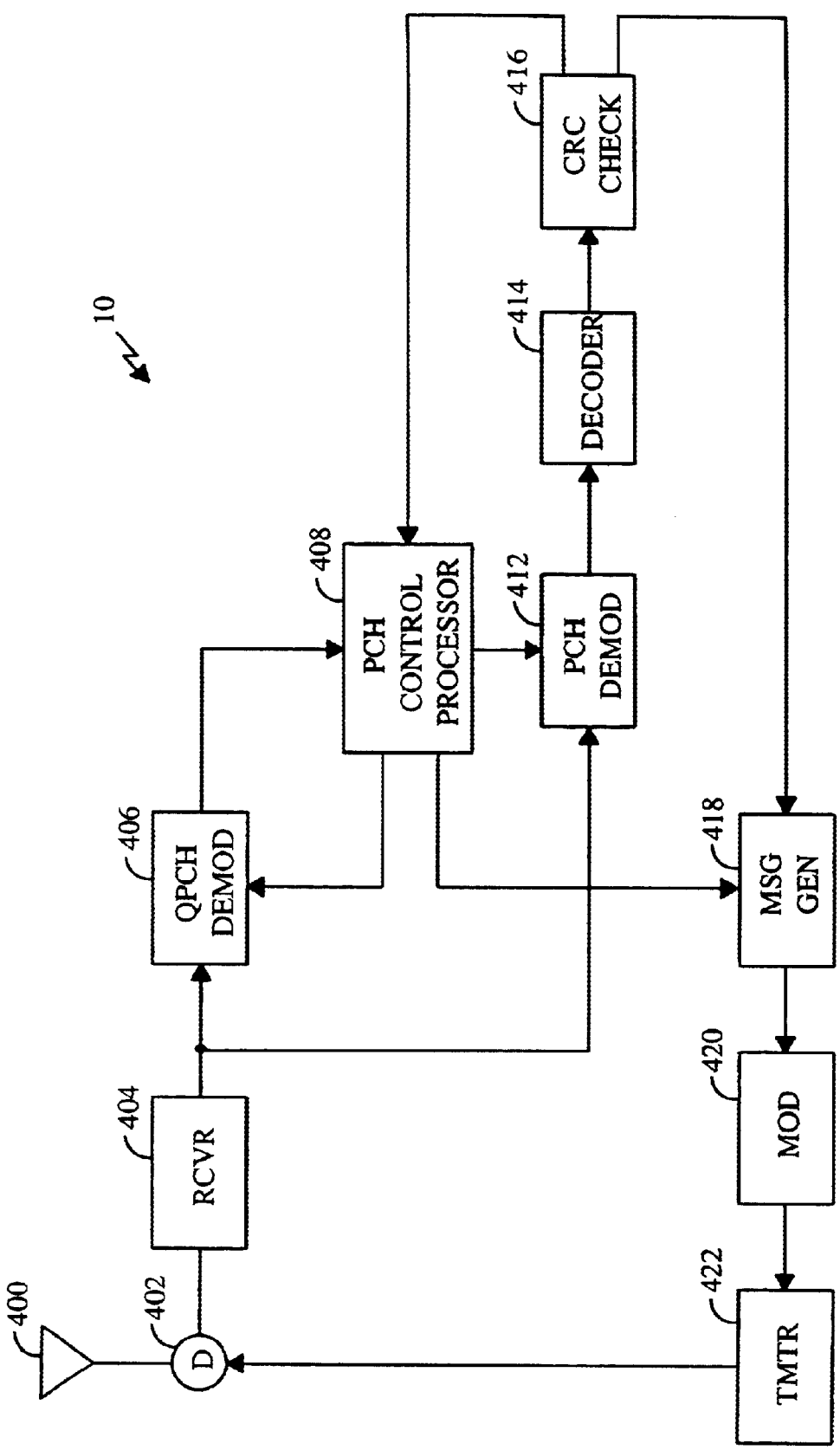
FIG. 4 is a block diagram of the mobile station of the present invention.
Figure 5:
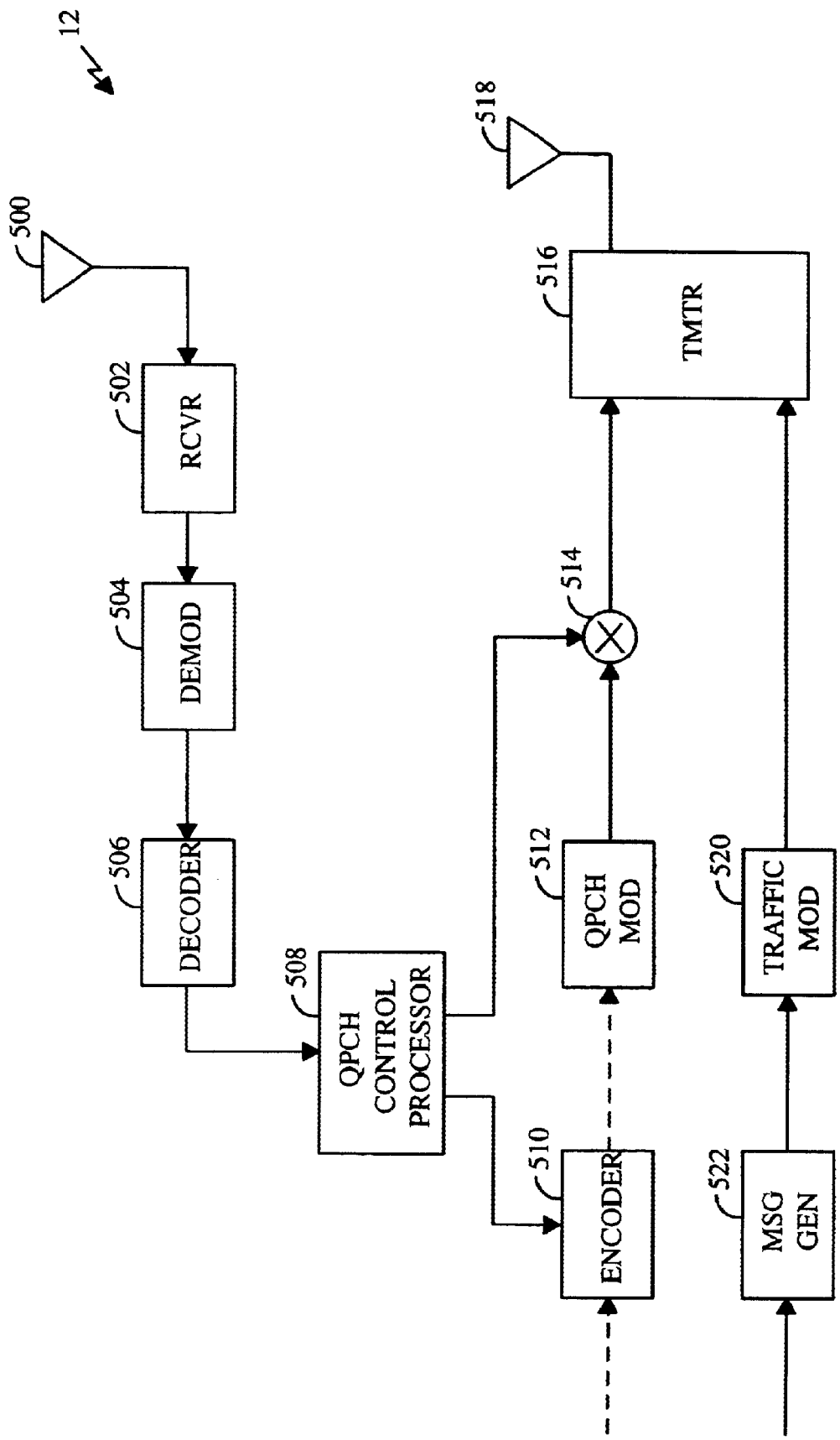
FIG. 5 is a block diagram of the base station of the present invention.

FIG. 4 illustrates a simplified block diagram of mobile station 10 capable of monitoring the performance of the quick paging channel as described above. The forward link signals transmitted from base station 12 are received at antenna 400 and provided through duplexer 402 to receiver (RCVR) 404. Receiver 404 down converts, filters and amplifies the received signal and provides the received signal to quick paging channel demodulator (QPCH DEMOD) 406.

Quick paging channel demodulator 406 demodulates the quick paging channel as described in the first section of the present application and provides a signal indicating whether or not a message is to be received by mobile station 10 on the paging channel. The signal is provided to paging channel control processor 408.

When the received quick paging channel indicator bit is "1" or when a sufficient period of time has elapsed since mobile station 10 received the paging channel, then paging channel control processor 408 provides a signal to paging channel demodulator (PCH DEMOD) 412, which activates the paging channel demodulator 412 and cause the paging channel demodulator 412 to demodulate the message transmitted on the paging channel at the appropriate designated time slot. The received signal from receiver 404 is provided to paging channel demodulator 412, which demodulates the full page as described above. The demodulated paging channel signal is provided to decoder 414 which decodes the received slot in accordance with a predetermined forward error correction coding format.

The error corrected symbols are then provided to CRC (cyclic redundancy check) check element 416. CRC check element 416 generates a version of the check bits from the decoded data and compares the locally generated CRC bits against the received CRC bits.

If the CRC checks, then the full page message or a portion thereof is provided to Paging Channel Control Processor 408. Paging Channel Control Processor 408 determines whether mobile station 10 should have received the paging channel in the current slot by determining whether a system configuration change has occurred or whether it or other mobile stations sharing its Quick Paging Channel indicator bit were paged for a directed page message in the manner described previously. Counters recording the number of hits, misses, false alarms and total paging channel slots monitored are maintained in the Paging Channel Control Process as described above.

When mobile station 10 finds its IMSI within the body of the full page message, message generator 418 generates an acknowledgement of the paging message. The acknowledgment message is provided to modulator 420 which modulates the acknowledgment message for transmission on the access channel. The generation of an access channel transmission is described in the above mentioned IS-95 standard.

The modulated access channel signal is provided to transmitter 422, which up converts, filters and amplifies the signal for transmission. The amplified signal is provided through duplexer 402 for transmission through antenna 400.

Mobile station 10 also compares the accumulated number of misses against a second threshold $T_{MI1}$. If the accumulated number misses within a predetermined time period exceeds the threshold value, then mobile station 10 transmits a quick paging channel status message to base station 12 indicating the number of hits, misses and false alarms detected within the current time interval. In an alternative implementation, mobile station 10 simply transmits a message indicating that the quick paging channel is not being received reliably. In the exemplary embodiment, the message indicating the accumulated number of hits, misses and false alarms is transmitted on the traffic channel. In an alternative embodiment, the message could be transmitted on the access channel or on a dedicated control channel.

An additional function of paging channel control processor 408 is to determine the energy threshold by which a quick paging message is detected. Paging channel control processor 408 uses the stored number of misses and false alarms to determine the threshold at which the quick paging channel message is detected. If the probability of false alarm is excessive, paging channel control processor 408 computes an increased threshold value and uses that increased threshold value in its detection of the Quick Paging Channel message. If the probability of a missed page is excessive, paging channel control processor 408 computes a decreased threshold value and uses that decreased threshold value in its detection of the Quick Paging Channel message.

In response to the signal indicative of the accumulated hit, miss and false alarm statistics message generator 418 generates a messages indicative of these numbers to modulator 420. Modulator 420 modulates the message in accordance with a spread spectrum format for transmission on either a dedicated traffic channel or a dedicated control channel. The modulated signal is provided to transmitter (TMTR) 422 which up converts, filters and amplifies the signal and provides the amplified signal through duplexer 402 for transmission through antenna 400.

The signal indicative of the hit, miss and false alarm statistics is received at base station 12 by antenna 500. The received signal is provided from antenna 500 to receiver 502. Receiver (RCVR) 502 down converts, filters and amplifies the received signal and provides the received signal to demodulator 504. In the exemplary embodiment, demodulator 504 demodulates the received signal in accordance with a spread spectrum demodulation format. The demodulated signal is then provided to decoder 506, which decodes the signal and provides the signal indicative of the hit miss and false alarms statistics of mobile station 10 to quick paging channel control processor 508.

In the exemplary embodiment, base station 12 receives indications of the performance of the quick paging channel (i.e. hit, miss, false alarm and total statistics) from each mobile station 10 in its coverage area. Quick Paging Channel control processor 508 determines from the signals indicative of the performance of the quick paging channel whether the strength of the quick paging channel must be increased or decreased or indicates that certain mobile stations should not use the Quick Paging Channel.

If the statistics indicate that the probabilities of misses and false alarms are below predetermined thresholds then the base station may increase the data rate on the quick paging channel or decrease the power of the quick paging channel. Transmitting the quick paging channel at a higher than necessary power or data rate reduces the capacity of base station 12. If, on the other hand, the statistics indicate that the number of misses and false alarms exceed a predetermined threshold, then the base station will either increase the data rate on the quick paging channel or increase the power of the quick paging channel so as to improve the performance of the quick paging channel.

When the signals from mobile stations 10 in the coverage area of base station 12 indicate that a change to the quick paging channel is necessary, quick paging channel control processor 508 sends a signal to either optional encoder 510 or to quick paging channel gain control element 514. A signal indicative of the presence or absence of a page for a set of mobiles receiving pages in a particular slot on a particular code channel is provided to optional encoder 510. Encoder 510 selects a forward error correction format in accordance with the signal from quick paging channel control processor 508. The optionally encoded quick paging channel symbols are then provided to quick paging channel modulator 512 which, in the exemplary embodiment, modulates the quick paging channel symbols in accordance with a predetermined spread spectrum format.

The modulated quick paging channel signal is provided to gain control element 514. Gain control element 514 amplifies the modulated signal in accordance with a signal provided by quick paging channel control processor 508. The amplified signal is provided to transmitter 516 which up converts, filters and amplifies the signal for transmission through antenna 518.

In addition to the methods for evaluating the performance of the Quick Paging Channel described above, an additional method by which to evaluate the performance of the Quick Paging Channel is to use a plurality of bits are reserved in the Quick Paging Channel. By fixing subsets of those reserved bits to represent the "1" and another subset to represent "0," mobile station 10 can set its Paging Channel detection threshold based on the energy levels at which the presence and absence of a Quick Paging message is detected in these reserved bits.

Thus, a dual channel method and system for paging cellular telephones and other wireless terminals that reduces standby power consumption has been described. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In a communication system wherein a receiver station receives information from a transmitting station, a method for monitoring a performance of a first channel indicative of the presence or absence of a forthcoming message at a receiver station, comprising the steps of:

receiving a signal on said first channel;

attempting to receive said forthcoming message;

determining from said steps of receiving a signal on said first channel and said step of attempting to receive said forthcoming message an indication of the performance of said first channel; and maintaining a performance status of the first channel.

2. The method of claim 1 further wherein said an indication of the performance of said first channel comprises an assignment of an event as either a hit, a miss, or a false alarm.

3. The method of claim 1 wherein said an indication of the performance of said first channel comprises an assignment of an event as either a hit, a miss, a false alarm, or an erasure.

4. The method of claim 1 wherein said step of receiving a signal on a first channel comprises receiving a quick paging channel message.

5. The method of claim 1 wherein said step of receiving a signal on a first channel comprises the steps of:

demodulating a received signal in accordance with a first spreading code to provide a demodulated signal;

comparing an energy of said demodulated signal against at least one energy threshold; and determining from said comparison the presence or absence of said forthcoming message.

6. The method of claim 5 wherein said step of attempting to receive said forthcoming message, comprises the steps of:

demodulating said received signal in accordance with a second spreading code to provide said forthcoming message; and determining from data in said forthcoming message said indication of the performance of said first channel.

7. The method of claim 6 wherein said step of determining from data in said forthcoming message said indication of the performance of said first channel comprises searching for the inclusion of a mobile station identifier.

8. The method of claim 6 wherein said step of determining from data in said forthcoming message said indication of the performance of said first channel comprises performing a numerical algorithm on an identifier for the receiver station and a numerical algorithm on an identifier found in said forthcoming message and determining whether the result of the two numerical algorithms equate.

9. The method of claim 1 further comprising the steps of:

tracking a time interval between consecutive receptions of each of said forthcoming messages;

comparing said time interval against a threshold value; and receiving said forthcoming message irrespective of the indication on said first channel when said time interval exceeds said threshold value.

10. The method of claim 2 further comprising the step of storing a record of a number of hits, misses, and false alarms that are recorded in a predetermined time interval.

11. The method of claim 5 further comprising the step of storing a record of a number of hits, misses, and false alarms that are recorded in a predetermined time interval.

12. The method of claim 11 further comprising the step of adjusting said energy threshold in accordance with said number of misses and false alarms.

13. The method of claim 12 further comprising the step of said receiver station transmitting a message indicative of the number of misses to said transmitting station.

14. The method of claim 13 further comprising the steps of:

receiving at said transmitting station said number of misses; and adjusting the transmission energy of said first channel in accordance with said number of misses.

15. The method of claim 13 further comprising the steps of:

receiving at said transmitting station said number of misses; and adjusting coding rate of said first channel in accordance with said number of misses.

16. The method of claim 2 further comprising the step of directly monitoring said forthcoming message when a number of said misses exceeds a predetermined threshold value.

17. The method of claim 1 further comprising the steps of:

transmitting a plurality of known symbols on said first channel wherein at least one of said known symbols represents the presence of a forthcoming message and wherein at least one of said known symbols represents the absence of a forthcoming message;

receiving said known symbols; and adjusting an energy threshold value determinative of the detection of the presence or absence of said forthcoming message in accordance with the received energies of said known symbols.

18. The method of claim 6 wherein said step of determining from data in said forthcoming message said indication of the performance of said first channel comprises searching for an indication of a change in system configuration in said forthcoming message.

19. The method of claim 6 wherein said step of determining from data in said forthcoming message said indication of the performance of said first channel comprises identifying a sequence number indication within a paging message directed to said receiver station.

20. The method of claim 1 further comprising the steps of:

receiving a second signal with a known relationship between the second signal and the signal on said first channel;

measuring the received energy of said second signal; and receiving said forthcoming message without regard to the signal on said first channel when the energy of said second signal is below a predetermined threshold.

21. A wireless communication system comprising:

a base station for transmitting Quick Page Messages on a Quick Paging Channel and Full Page Messages on a Paging Channel; and a mobile station for monitoring the Quick Paging Channel to determine the presence or absence of a Full Page Message on the Paging Channel and maintaining a performance status of the quick Paging Channel.

22. A mobile station comprising:

a receiver for receiving an indication message on a first channel indicative of the presence or absence of a forthcoming message on a second channel, and for receiving the forthcoming message on the second channel; and a control processor configured to evaluate the indication message received on the first channel and maintain a performance status of the first channel.

23. The mobile station as in claim 22, further comprising:

means for measuring energy of the received indication message;

means for comparing the energy of the received indication message to a threshold; and declaring an erasure if the energy of the received indication message is below the threshold.

24. The mobile station as in claim 22, further comprising:

means for periodically monitoring an assigned slot of the second channel regardless of the indication message on the first channel.

25. The mobile station as in claim 24, wherein means for periodically monitoring an assigned slot of the second channel, comprises monitoring the assigned slot of the second channel over a time window.

26. The mobile station as in claim 25, wherein the time window is a moving window.

27. The mobile station as in claim 26, wherein the moving window starts on occurrence of receiving the indication message on the first channel and receiving the corresponding message on the second channel.

28. The mobile station as in claim 22, further comprising:

first counter responsive to occurrence of a miss; and second counter responsive to occurrence of a hit; and means for determining a status of the first channel based on the first and second counters.

29. The mobile station as in claim 28, further comprising:

means for comparing a count of the first counter to a threshold; and means for monitoring each assigned slot of the second channel when the count of the first counter exceeds the threshold.

30. A base station comprising:

a control processor generating Quick Paging Messages and Full Page Messages;

a transmitter for transmitting the Quick Paging Messages on a Quick Paging Channel and the Full Page Messages on a Paging Channel, said transmitter for transmitting a request for a Quick Paging Channel status update; and a receiver for receiving a Quick Paging Channel status message in response to the request for the Quick Paging Channel status update.

31. The base station as in claim 30, wherein the Quick Paging Channel is transmitted at a fixed transmission energy in relation to a pilot channel.

32. In a communication system, an apparatus for monitoring a performance of a first channel indicative of the presence or absence of a forthcoming message at a receiver station, comprising the steps of:

means for receiving a signal on said first channel;

means for attempting to receive said forthcoming message;

means for determining from said steps of receiving a signal on said first channel and said step of attempting to receive said forthcoming message an indication of the performance of said first channel; and means for maintaining a performance status of the first channel.

* * * * *